Nov. 25, 1969 E. L. BENDER ET AL 3,479,971
METHOD AND APPARATUS FOR PROOFING A BAKERY PRODUCT
Filed April 5, 1967 5 Sheets-Sheet 1

INVENTORS.
ERWIN L. BENDER
RICHARD H. SWANSON

Nov. 25, 1969   E. L. BENDER ET AL   3,479,971
METHOD AND APPARATUS FOR PROOFING A BAKERY PRODUCT
Filed April 5, 1967   5 Sheets-Sheet 2

INVENTORS.
ERWIN L. BENDER
RICHARD H. SWANSON

INVENTORS.
ERWIN L. BENDER
RICHARD H. SWANSON

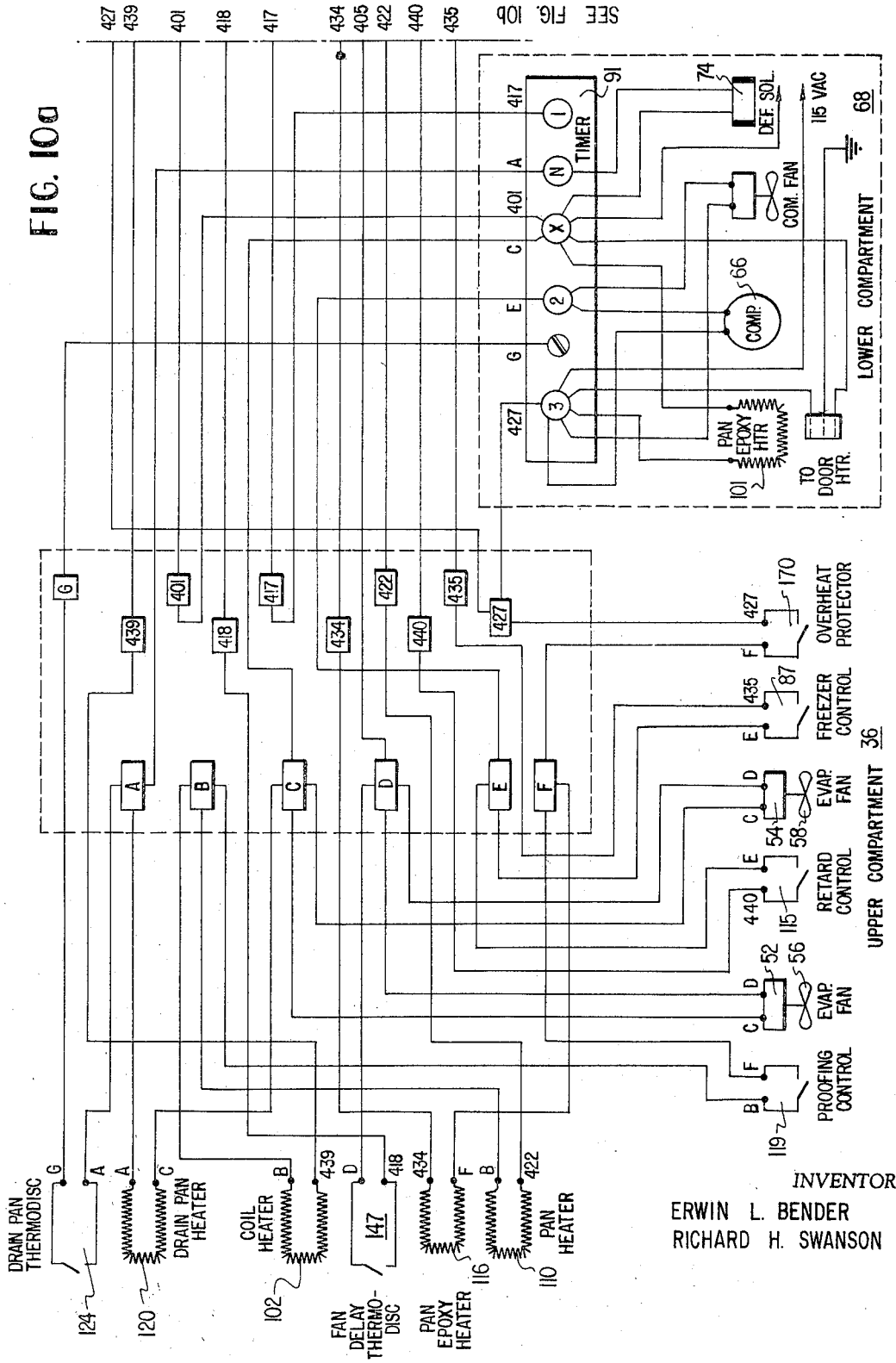

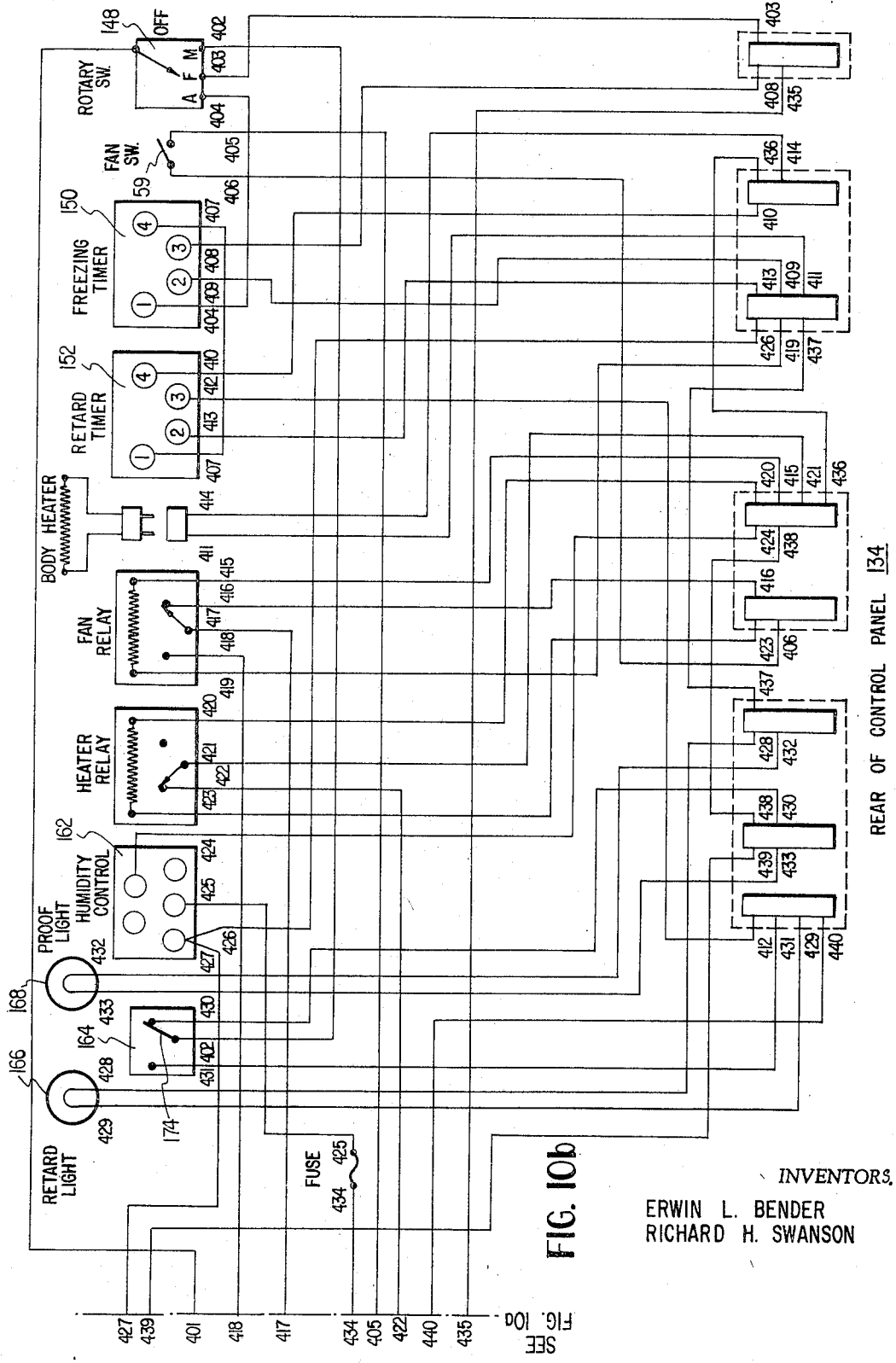

United States Patent Office 3,479,971
Patented Nov. 25, 1969

3,479,971
METHOD AND APPARATUS FOR PROOFING A BAKERY PRODUCT
Erwin L. Bender, Beaver Dam, and Richard H. Swanson, Manitowoc, Wis., assignors to The Manitowoc Company Inc., Manitowoc, Wis., a corporation of Wisconsin
Filed Apr. 5, 1967, Ser. No. 628,753
Int. Cl. A21d 8/02
U.S. Cl. 107—54                                    14 Claims

ABSTRACT OF THE DISCLOSURE

This invention relates to a method and apparatus for proofing a bakery product, such as dough for bread, pastries, rolls and the like, in which the prepared dough is placed in a cabinet and frozen in order to preserve the dough until needed. At a predetermined time prior to the actual baking operation, the same cabinet is warmed to allow the dough to defrost prior to proofing. Although the commencement of the thawing or retard step may be manually effected, it is preferred that this step be automatically commenced. After the dough in the cabinet has been thawed, the proofing operation is commenced by the use of either automatically operable means or by manually operated mechanisms. Since the dough remains in the same cabinet through the freezing, thawing, and proofing steps, numerous economies may be made in a bakery operation.

Background of the invention

The conduct of a bakery operation presents many logistical and handling problems. Some of these problems have their genesis in the need to provide fresh bakery products early each morning for immediate delivery to retail outlets for sale the same day to the ultimate consumer.

One of the ways of leveling out the work to be done is by preparing dough in the afternoon and early evening and then freezing it for use the following morning. Conventionally, a number of employees report for work many hours prior to the actual commencement of the baking operation in order to transfer the frozen prepared dough from the freezer to a thawing station where the dough is allowed to thaw. After the dough is thawed to the extent that the center is no longer frozen, it is transferred to a proofing cabinet where the temperature and humidity are raised in order to allow the dough to rise. This conventional procedure obviously necessitates separate cabinets for enclosures for freezing and proofing as well as requiring the presence and labor of a number of employees to effect the changeover from the freezing or preserving operation to the proofing operation.

Summary of the invention

The instant invention comprises a method for eliminating heretofore necessary manipulative steps in the conduct of a bakery operation by providing a combined freezing, thawing and proofing enclosure which eliminates the necessity for physically transferring frozen dough from the freezing unit to a thawing station and then to a proofing unit. In a preferred form of the instant invention, the necessity for employees to report for work many hours prior to the actual baking step is eliminated by providing automatic means for changing the temperature in the combined freezing and proofing cabinet to effect automatically the changeover from the freezing step to the proofing step.

It is accordingly a primary object of the instant invention to provide a method of proofing dough in which the freezing, thawing and warming steps are conducted in the same cabinet or enclosure.

Another object of the instant invention is to provide a method of proofing dough which eliminates the necessity for separate freezing and proofing cabinets, thereby reducing the capital outlay necessary in the conduct of a bakery operation.

Still another object of the instant invention is to provide a method of proofing dough wherein employees need not report for work until immediately prior to the baking operation.

Other objects and important features of the instant invention will be apparent from a study of the specification following taken with the drawing, which together show, illustrate, describe and disclose a preferred embodiment of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Brief description of the drawings

FIGURES 10a and 10b are schematic views of a representative electric circuit for controlling the operation of the apparatus of the invention.

Description of the preferred embodiment

Figure 1:
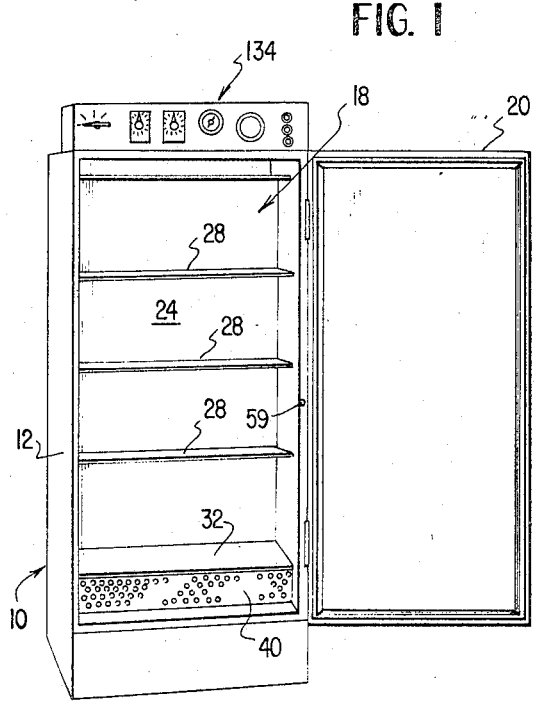
FIGURE 1 is a perspective view of a combined freezing and proofing cabinet illustrated with the door open to expose the interior thereof for view.
Figure 2:
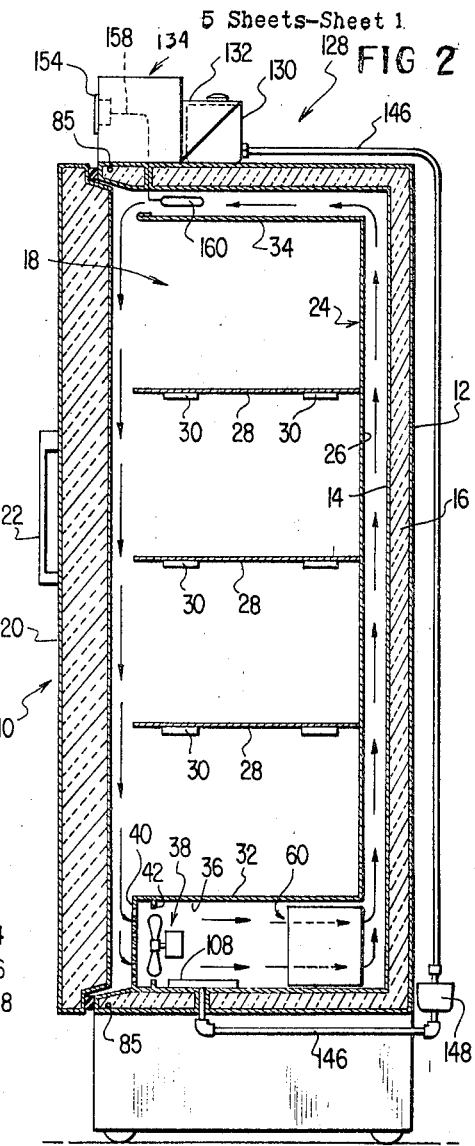
FIGURE 2 is an enlarged side elevational view of the cabinet of FIGURE 1, certain parts being broken away for purposes of illustration.

Attention is now directed to FIGURES 1 and 2 of the drawing wherein there is shown a combined freezing and proofing cabinet 10 of the type having an exterior shell 12, an interior shell 14 and suitable insulation material 16 therebetween. The shells 12, 14 form an opening to provide access to an enclosure 18 sealed by a suitable insulated door 20 having a handle 22 thereon.

Within the enclosure 18 there is provided a partition 24 spaced from the interior shell 14 and cooperating therewith to form a passageway 26 to provide for the circulation of air through the enclosure 18. A plurality of shelves or racks 28 are positioned within the enclosure 18 by suitable support structure 30 affixed to the interior shell 14. It will be readily apparent that racks 28 are adapted to receive trays or other containers of dough that is to be placed inside the enclosure 18 for freezing and subsequent proofing.

Figure 5:
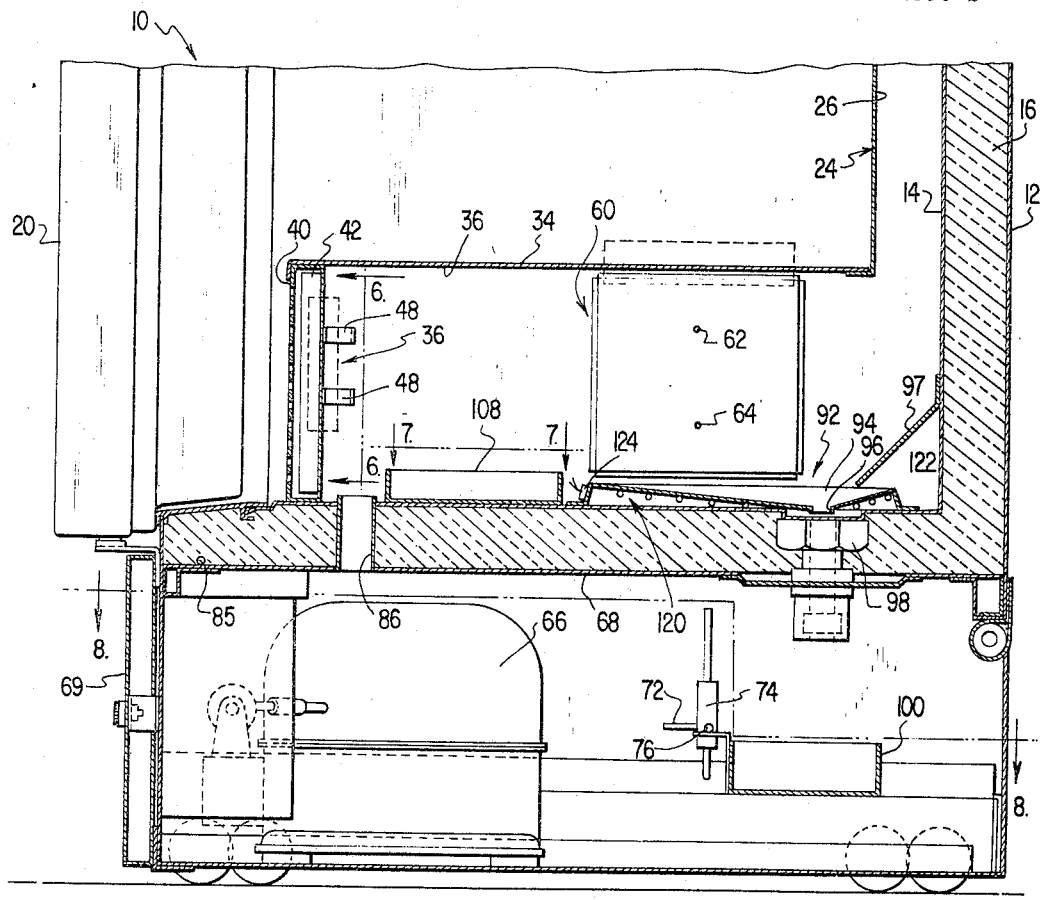
FIGURE 5 is an enlarged side elevational view of the bottom portion of the cabinet of FIGURES 1 and 2, certain parts being broken away for purposes of illustration.

As shown in FIGURES 2 and 5, the partition 24 includes a lower horizontal segment 32 overlying the bottom of the enclosure 18 and an upper horizontal segment 34 underlying the top of the enclosure 18. Positioned in a compartment 36 formed by lower segment 32 and the bottom of the enclosure 18 is fan structure 38 adapted to draw air through a foraminous plate 40 which provides communication between the compartment 36 and the dough receiving area of the enclosure 18.

As is readily apparent, air is circulated throughout the enclosure 18 by operation of the fan structure 38 which delivers air through the compartment 36 and the passageway 26 into the dough-receiving area of the enclosure 18. As will be pointed out more fully hereinafter, the freezing, thawing, warming and humidifying steps are effected by treating the air passing through the compartment 36.

The fan structure 38 comprises a mounting plate 42 releasably secured to the partition segment 34 in any suitable manner. The mounting plate 42 forms a pair of openings 44, 46 across each of which is positioned a pair of brackets 48, 50. The brackets 48, 50 carry electric motors 52, 54 on the output shaft of which are mounted fan blades 56, 58 coaxial with the openings 44, 46.

It will be readily seen that the operation of the motors 52, 54 will operate to rotate the fan blades 56, 58 to draw air from the enclosure 18 through the foraminous plate 40. The air will move through the compartment 36 and the passayeway 26 to again discharge into the interior of the enclosure 18. Preferably the electric motors 52, 54 are interconnected with a switch 59 actuated by the door 20 so that air circulates within the enclosure 18 only when the door 20 is closed.

Figure 9:
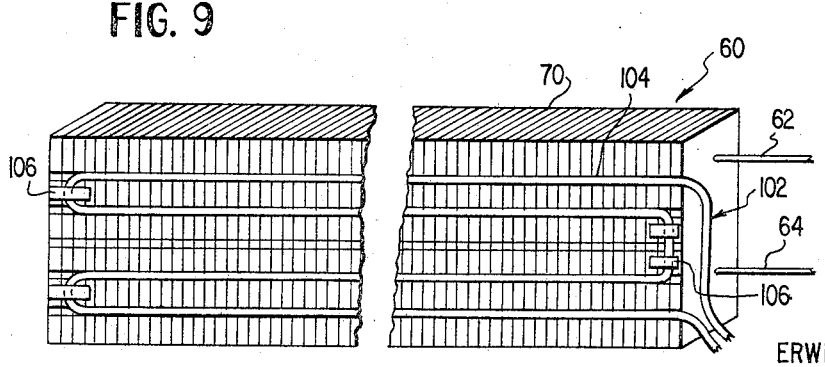
FIGURE 9 is a perspective view of the refrigeration coils utilized to cool the compartment during the freezing operation with an electric heater thereon usable to defrost the cooling coils and to provide a source of heat during the warming step.

The cooling equipment of the invention comprises heat exchange structure 60 positioned within the compartment 36 as shown in FIGURE 5. The heat exchanger 60 includes a cooling coil having an input conduit 62 and an output conduit 64 for delivering refrigerating fluid from a suitable compressor 66 positioned in a second compartment 68 underlying the compartment 36 and the enclosure 18. As also shown in FIGURE 5, a door 69 underlies the door 20 and provides access to the compartment 68 for purposes of maintenance and the like. The heat exchanger 60 also provides a plurality of heat exchanging fins 70 of suitable configuration as shown best in FIGURE 9.

The compressor 66 may be of any suitable construction and is illustrated as including a suction inlet 64 corresponding to the output conduit from the heat exchanger 60. Leaving the compressor 66 is a first discharge conduit 72 leading to a hot gas solenoid valve 74. An inlet conduit 76 leads to a precooler (not shown) of suitable construction located within the lower compartment 68. A precooler outlet conduit 78 leads from the precooler (not shown) back to the compressor 66 for a second compression cycle. A conduit 80 leads from the discharge side of the second compressor stage to a condenser (not shown) in the compartment 68.

An outlet conduit 82 leads from the condenser (not shown) to a dryer 84 of suitable construction. The heat exchanger input conduit 62 is illustrated as a capillary tube for purposes of refrigerant control and connects the dryer 84 and the cooling coils of the heat exchanger 60. Since the exterior shell 12 of the cabinet 10 tends to "sweat" adjacent the door 20 during the freezing cycle a body heater 85 comprising an electric resistance element is preferably provided to heat the exterior shell 12 during the freezing cycle to obviate the buildup of water droplets on the cabinet 10.

Figure 8:
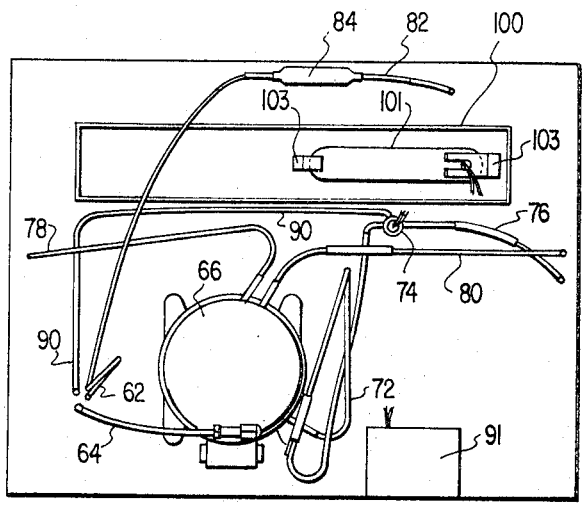
FIGURE 8 is a horizontal cross-sectional view of the device of FIGURE 5 taken substantially along the line 8—8 thereof as viewed in the direction indicated by the arrows, illustrating the layout of the equipment compartment.

For clarity of illustration, the piping of FIGURE 8 has not been shown in FIGURE 5, but it will be noted that a sleeve 86 extends through the bottom of the outer and inner shells 12, 14 and the insulation material 16 to provide for the disposition of the conduits 62, 64 between the compartments 36, 38. A suitable apertured plug (not shown) may be positioned within the sleeve 86 to pass the conduits 62, 64 therethrough and to preclude substantial air flow through the sleeve 86.

Figure 6:
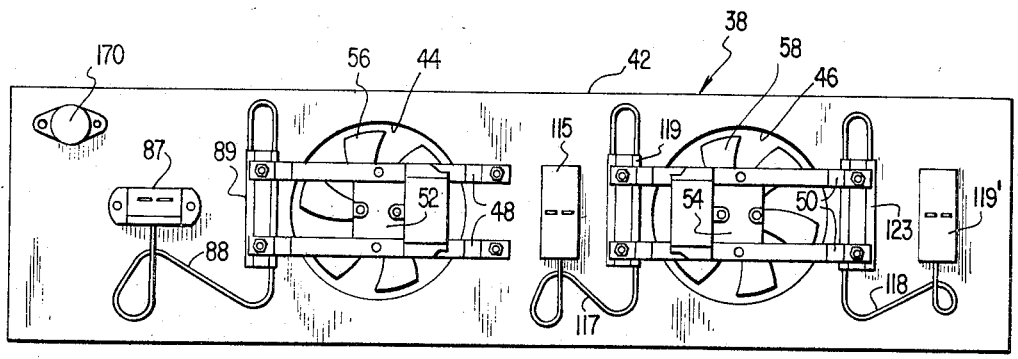
FIGURE 6 is a vertical cross-sectional view of the structure of FIGURE 6 taken substantially along line 6—6 thereof as viewed in the direction indicated by the arrows, illustrating fins or blowers to effect air circulation within the cabinet.

Referring to FIGURE 6, a freezing control element 87 is secured to the mounting plate 42 and is equipped with a capillary tube 88 leading into a temperature sensor 89 positioned adjacent the fan 56. Since the liquid within the capillary tube 88 expands and contracts in accordance with the temperature sensed by element 89 to open and close a conventional liquid level responsive switch (not shown), the control element 87 is able to regulate the operation of the compressor 66 and thereby maintain the temperature at or below the freezing point.

Referring again to FIGURE 8, it will be noted that a conduit 90 is associated with the hot gas solenoid valve 74 and extends toward the sleeve 86. The conduit 90 is placed in communication with the input conduit 62 adjacent its connection with the heat exchanger structure 60. Since it is advantageous to defrost the heat exchanger 60 from time to time, this result may be accomplished by operating the hot gas solenoid valve 74 so that the hot fluid discharged from the compressor 66 passes through the discharge conduit 72, the solenoid valve 74, the conduit 90 and the heat exchanger 60 to warm the cooling coil and thereby melt any frost accumulation on the fins 70. To this end a timer 91, which preferably operates only during the freezing cycle, is connected to the valve 74 for periodically opening the valve 74 and defrosting the heat exchanger 60.

Referring now to FIGURE 5, a collecting pan 92 is disposed beneath and downstream of the heat exchanger 60 to collect drippage therefrom during the defrost cycle. The collecting pan 92 is illustrated as a shallow impervious tray having sloping sidewalls 94 for delivering the liquid through an aperture 96. A deflector 97 is affixed to the interior of the passageway 26 and extends, from a position downstream of the heat exchanger 60, downwardly toward the pan 92. Any liquid blown from the heat exchanger 60 will impinge on the deflector 97 and drip into the pan 92.

In order to prevent the drippage freezing on the collecting pan 92, a heat source 120 comprising an electrical resistance element 122 is positioned beneath the sloping sidewalls 94 of the pan 92 as shown best in FIGURE 5. To prevent the heat source 120 from increasing the temperature within the enclosure, beyond a desirable limit, a suitable temperature responsive element 124 is positioned on the pan 92 and is arranged to sever the electrical circuit leading to the heat source 120.

When the liquid passes through the aperture 96 it falls through a connector 98 which carries a conventional floating ball check valve (not shown) into a reservoir 100 disposed in the compartment 68. In order to evaporate the drippage resulting from the defrosting of the heat exchanger 60 and thereby obviating the necessity of periodically emptying the reservoir 100, a heat source 101 is provided. The heat source 101 is positioned within the reservoir 100 by a plurality of clips 103 and preferably constitutes a continuously operating heater.

After the dough has been frozen for the desired length of time, the air passing through the compartment 36 is warmed above the freezing point but well below the proofing temperature in order to thaw the dough within the enclosure 18 preparatory to proofing. For purposes of convenience, this may be called the retard step and is continued until the dough is completely thawed.

To achieve this end, a number of heat sources are provided within the compartment 36, although it should be understood that a single source of sufficient size may be used. As shown best in FIGURE 9, a first heat source 102 is juxtaposed into the heat exchanger fins 70 and constitutes an elongated electrical resistance element 104 secured to the heat exchanger 60 by plurality of clips 106.

Figure 7:
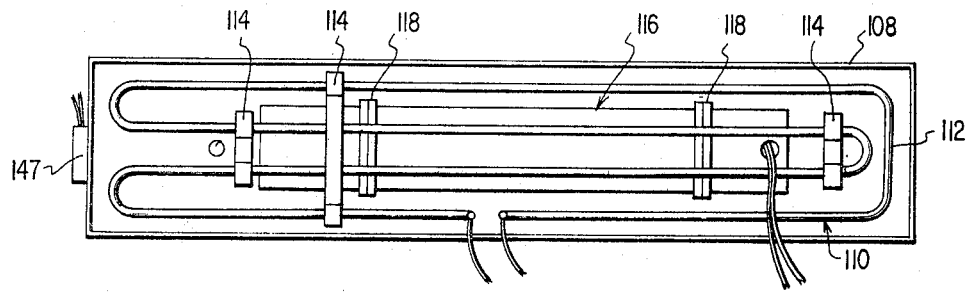
FIGURE 7 is a horizontal cross-sectional view of the device of FIGURE 5 taken substantially along line 7—7 thereof as viewed in the direction indicated by the arrows and illustrating a humidifier pan.

Positioned within the receptacle 108 in the compartment 36 is a second heat source 110 comprising an elongated electrical resistance element 112. As shown best in FIGURE 7, the resistance element 112 is secured to the bottom of the receptacle 108 by plurality of suitable clips 114. Since it is desirable to uniformly warm the enclosure 18, the fans 56, 58 are preferably operated during the retard step.

In order to control the temperature during the retard step, a retard control 115 is secured to the mounting plate 142 and is connected by a capillary tube 117 to a temperature sensor 119 positioned adjacent the fan 58. When the temperature within the enclosure 36 exceeds the desired temperature for thawing, the liquid in the sensor 119 expands so that the conventional liquid level responsive retard contol element 115 breaks the electrical circuit leading to the heaters 102, 110, in the fans 56, 58.

After the dough has been completely thawed, it is necessary to bring the temperature in the enclosure 18 up to a proofing temperature in order to allow the dough to rise. To this end, a third heat source 116 is positioned within the receptacle 108 and comprises an epoxy resin coated electrical resistance element spaced from the resistance element 112 by a plurality of shims 118.

In order to control the temperature of the enclosure 18 during the proofing step, a proofing control element 119' is secured to the mounting plate 42 and is connected through a capillary tube 121 to a temperature sensor 123 positioned adjacent the fan 58. It will be readily apparent that when the temperature of the air passing through the compartment 36 exceeds a predetermined limit, the proofing control element 119' acts to sever the electrical circuit leading to the heaters 102, 110, 116 in the fans 56, 58 and thereby maintain the temperature within the enclosure at a proofing level.

Figure 4:
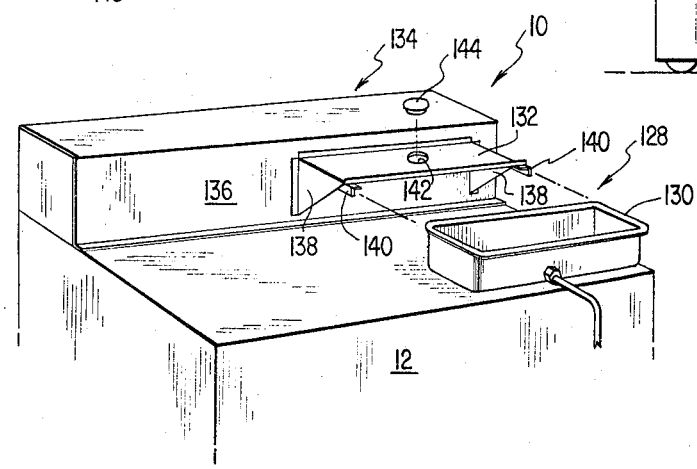
FIGURE 4 is a perspective view of the top rear portion of the cabinet of FIGURES 1 and 2 illustrating a means by which a reservoir of water may be attached thereto in order to provide a source of water vapor in order to increase the humidity inside the cabinet.

One of the requirements for proofing dough is high humidity. As shown best in FIGURE 2, receptacle 108 is connected to a water supply system 128. As shown best in FIGURES 2 and 4, the supply system 128 includes a receptacle 130 positioned on the top of cabinet 10 under a plate 132 affixed to the back of a control panel 134. Plate 132 is connected to a back wall 136 of the control panel 134 by a pair of supports 138 with suitable angle flanges 140 acting to receive the edges of the receptacle 130. A suitable filling opening 142 and cap 144 are provided to allow an operator to fill receptacle 130 as needed. It should be apparent that this may be accomplished automatically by the use of suitable controls.

Extending rearwardly of the cabinet 10 is a water supply line 146 leading to a float valve arrangement 148 located in a substantially horizontal plane with respect to the receptacle 108. A continuation of the water supply line 146 leads to the bottom of the receptacle 108 for delivering water thereto. It will be evident that the evaporation of water from the receptacle 108 will actuate the float valve assembly 148 to deliver an additional increment of water to the receptacle 108 as needed.

As previously mentioned, the heaters 110, 116 are operated during the proofing step in order to raise the temperature within the enclosure 18 to a proofing level. Since the heaters 110, 116 are positioned within the receptacle 108 it will be evident that the water therein will be evaporated to provide humidity. At the commencement of the proofing step, the water within the receptacle 108 will be rather cool, thereby requiring a relatively high heat input during the initial stages of proofing. After the proofing temperature has been attained, a substantially smaller heat input is needed to maintain the temperature of water within the receptacle 108 at a desired level. It is also desirable to warm the water within the receptacle 108 and raise the temperature within the compartment 36 prior to operating the circulating fans 56, 58.

To accomplish these results, a temperature responsive element 147 is secured in heat exchanging relation with the receptacle 108 and is located in the circuit of FIGURES 10A and 10B, so that when the temperature of the water within the receptacle 108 attains the desired level, element 147 breaks the electrical circuit leading to the heater 110 and closes the electrical circuit leading to the fan motors 52, 54. Accordingly, the water within the receptacle 108 is rapidly heated to the desired level to achieve high humidity prior to the operation of the fans 56, 58. When the desired temperature level is reached, the heater 116 maintains the water temperature at the desired level during the operation of the fans 56, 58.

Figure 3:
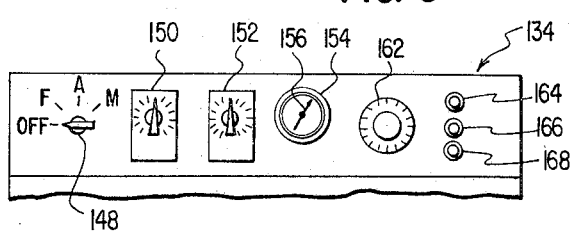
FIGURE 3 is an enlarged view of the cabinet of FIGURES 1 and 2 illustrating the control panel thereof.

As previously mentioned, the components of the cabinet 10 may be set in motion either manually or by automatic controls. Referring now to FIGURES 1 and 3, the control panel 134 includes a rotary switch 148 for setting the operation of the cabinet 10 in an OFF position, a freeze position, an automatic position and a manual position all as will be more fully pointed out hereinafter. Control panel 134 also includes a first timer 150 arranged to control the length of the freezing cycle of the dough placed within the enclosure 18. Timer 150 is also arranged to turn off the refrigerating equipment in the lower compartment 68 to allow the dough within the enclosure 18 to begin thawing prior to the commencement of the proofing cycle. Also disposed on the control panel 134 is a second timer 152 arranged to control the thawing time of the dough placed within the compartment 18. The timer 152 operates in a similar manner as the timer 150 and controls the operation of the cabinet 10 for a time period from the end of the freezing step to the end of the thawing or retard step.

Also located on the control panel 134 is a thermometer 154 having a suitable pointer 156 associated with a graduated dial (not shown). The thermometer 154 is connected by a suitable capillary connection 158 to a temperature sensor 160 positioned within the passageway 26 as shown in FIGURE 2. A humidistat 162 is also mounted on the control panel 134 and constitutes an adjustable voltage control interconnected with the epoxy heater 116 for controlling the rate of evaporation of water from the receptacle 108.

A toggle switch 164 is connected in the circuit of FIGURES 10A and 10B to control the retard-proof steps when the rotary switch 148 is located at the manual position. A pair of suitable warning lights 166, 168 are mounted on the control panel 134 to indicate the retard and proofing cycle segments respectively.

Located on the mounting plate 42 of the fan structure 38 is an overheat protector 170 of any suitable type, for example, a bimetallic thermostat. The overheat protector 170 senses an abnormal build-up of temperature within the compartment 36 and at a predetermined temperature level acts to break the circuit leading to the first heat source 102, the second heat source 110 and the third heat source 116.

In the operation of the cabinet 10, the individual opens the door 20 and places the racks or other receptacles of dough on the shelves 28. Since the dough is normally prepared during the afternoon or early evening hours, it will be apparent that the dough is preferably first placed in the cabinet 10 during the daylight hours. The door 20 is then closed and the rotary switch 148 is manipulated by the individual to initiate the operation of the cabinet 10. For purposes of illustration, it is assumed that the individual desires to use the manual operating capabilities of the cabinet 10 and therefore turns the rotary switch 148 to the freeze position, F.

With this setting on the control panel 134, the compressor 66 will be actuated to maintain a freezing temperature within the enclosure 18 until the controls on the panel 134 are again manipulated.

When the individual desires to begin the retard step, the only procedures that need be taken involve the control panel 134 so that the dough within the enclosure 18 need not be moved. The rotary switch 148 is moved to the manual position, M, and the toggle switch 164 is manipulated such that a contact arm 174 moves in a counterclockwise direction (FIGURE 10B). The electrical circuit of FIGURES 10A and 10B is such that the temperature within the enclosure 18 is raised to a level above the freezing point and below the proofing point so that the dough may completely thaw.

When the individual desires to begin the proofing operation, the only steps that need be taken involve the control panel 134 so that the dough within the enclosure 18 need not be moved. The toggle switch 164 is manipulated such that the contact arm 174 moves in a clockwise direction (FIGURE 10B). The individual also rotates the dial of the humidistat 162 in order to set the desired level of humidity within the enclosure 18. The proofing light 168 begins to burn thereby indicating that the equipment within the cabinet 10 is operating in the proofing cycle. The coil heater 102, the receptacle heater 110, the receptacle epoxy heater 116 and the drain pan heater 120 are all actuated to increase the temperature of air flowing through the compartment 32 to the desired level.

After the individual has insured that the dough within the enclosure 18 has been proofed to a sufficient degree, the rotary switch is turned to the OFF position and the dough removed from the shelves 28 and placed in an oven (not shown) for the actual baking operation. It will be evident that while this mode of operation of the cabinet 10 obviates the necessity of moving the dough receptacles from a freezing compartment to a proofing compartment, it requires the attention of an individual to maniplate controls.

In the event that the individual desires an automatic operation of the cabinet 10, the rotary switch 148 is moved to the automatic position, A, followed by the manipulation of timers 150, 152 and the humidistat 162. The freezing cycle is automatically terminated by the timer 150 after the desired length of time. The duration of the proofing step is controlled by the timer 152. After the lapse of a predetermined time, the proofing cycle is automatically initiated and is terminated by the individual in charge of the operation by manipulating the rotary switch 148. Accordingly, the timers 150, 152 may be set such that the individuals reporting for work report for duty slightly before the dough in the enclosure 18 is fully proofed. Since the baking operation preferably commences early in the morning because of the exigencies of the bakery business, the proofing step preferably begins during the night time hours.

It will be evident that the use of the automatic capabilities of the cabinet 10 will allow the dough to be frozen and proofed within the enclosure 18 thereby avoiding the necessity of moving the dough receptacles from a freezing compartment to a proofing compartment and also avoiding the necessity of individuals reporting for work many hours prior to the actual baking operation.

What is claimed is:

1. A method of proofing dough comprising the steps of:
    placing the dough in a cabinet;
    freezing the dough in the cabinet; and
    after a desired time lapse then proofing the dough in the cabinet at proofing temperature and proofing humidity until the dough is substantially proofed.

2. The method of claim 1 wherein the freezing step comprises circulating cold air through the cabinet.

3. The method of claim 1 wherein the freezing step comprises cooling at least a portion of the cabinet by conduction.

4. The method of claim 1 wherein the proofing step comprises circulating warm air through the cabinet.

5. The method of claim 1 wherein the proofing step comprises increasing the humidity by heating a body of water in the cabinet.

6. The method of claim 1 further comprising the step of
    warming the dough in the cabinet to a temperature between the freezing and proofing temperatures for a time sufficient to thaw the dough completely, the warming step being commenced immediately after the freezing step.

7. The method of claim 6 wherein the warming step is automatically commenced after the lapse of predetermined times between the freezing and proofing steps.

8. The method of claim 1 further comprising the step of thawing the dough in the cabinet between the freezing and proofing steps.

9. A method of proofing dough comprising the sequential steps of:
    placing the dough in an enclosure;
    freezing the dough in the enclosure;
    automatically in response to the lapse of a predetermined time, thawing the dough in the enclosure; and then
    warming the dough in the enclosure to proofing temperature until the dough is substantially proofed.

10. The method of claim 9 further comprising the step of increasing the humidity in the enclosure contemporaneously with the warming step.

11. An apparatus for proofing dough comprising
    a cabinet having an openable door;
    a partition in the cabinet forming a dough receiving enclosure and a compartment for receiving air treatment apparatus;
    structure in the enclosure for supporting a plurality of dough receiving trays;
    structure associated with the cabinet forming at least one passageway for directing air from the compartment through the enclosure;
    fan structure in the compartment for propelling air through the passageway;
    heat exchanger structure in the compartment;
    refrigeration apparatus associated with the cabinet and operatively connected to the heat exchanger structure for chilling the heat exchanger structure;
    a tray in the compartment for providing high humidity during portions of operating the proofing apparatus;
    mechanism for automatically adding water to the water receiving tray;
    heating structure in the compartment for heating air flowing therethrough during operation of the proofing apparatus, the heating structure having at least one heating device in the tray for warming the water therein; and
    control structure for selectively operating the heating structure and refrigeration apparatus comprising
    manually operated means for actuating the heating structure for warming the air flowing through the compartment to a temperature substantially below a proofing temperature;
    manually operated means for actuating the heating structure including the heating device for warming the air flowing through the compartment to a proofing temperature for raising the air humidity; and
    manually operated means for actuating the refrigeration apparatus for cooling the air flowing through the compartment to a freezing temperature.

12. The proofing apparatus of claim 11 wherein the control structure further comprises
    manually operated means for automatically actuating the refrigeration apparatus for a preselected period of time, then actuating the heating structure a preselected period of time for warming the air flowing through the compartment to a temperature substantially below the proofing temperature and then actuating the heating structure including the heating device for warming air flowing through the compartment to a proofing temperature and for raising the air humidity.

13. The apparatus of claim 11 further comprising means for periodically defrosting the heat exchanger structure during the freezing operation of the proofing apparatus.

14. The apparatus of claim 13 further comprising a liquid receiving pan disposed outside the enclosure and compartment to receive drippage from the heat exchanger; a heating device in the pan for evaporating the liquid drippage.

References Cited
UNITED STATES PATENTS

| | | | |
|---|---|---|---|
| 1,859,613 | 5/1932 | Bailey | 165—3 X |
| 2,621,650 | 12/1952 | Pittendreich | 126—281 X |
| 3,212,903 | 10/1965 | Oberholtzer | 99—90 |
| 3,375,117 | 3/1968 | Schremmer | 99—90 |

WILLIAM I. PRICE, Primary Examiner

ROBERT I. SMITH, Assistant Examiner

U.S. Cl. X.R.

107—7